Dec. 30, 1952     J. DUNGLER     2,623,361
FLUID ACTUATED PRESSURE DEVICE
Filed Feb. 27, 1948     3 Sheets-Sheet 1
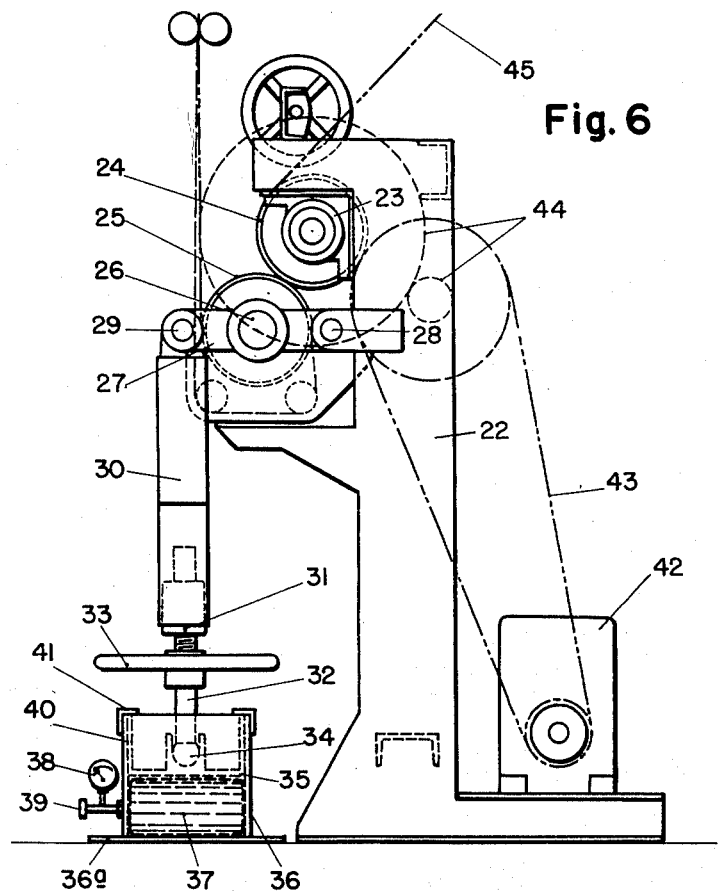
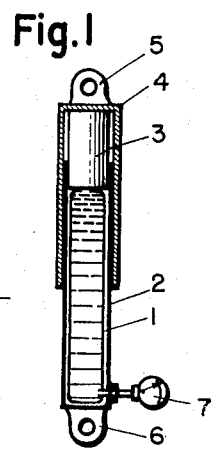
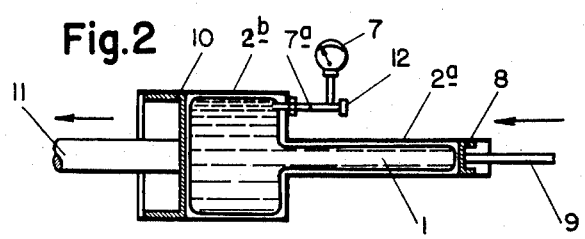
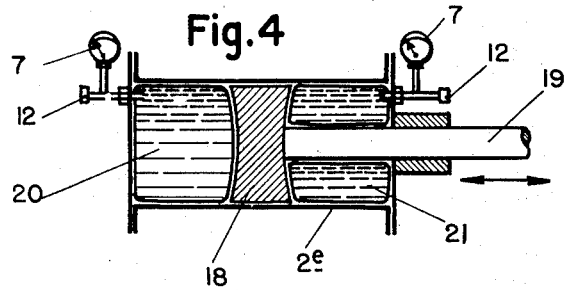
INVENTOR:
JULIEN DUNGLER Dec. 30, 1952  J. DUNGLER  2,623,361
FLUID ACTUATED PRESSURE DEVICE
Filed Feb. 27, 1948  3 Sheets-Sheet 2
Fig. 5
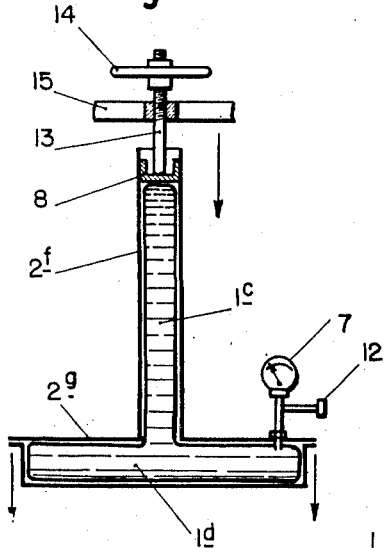
Fig. 3
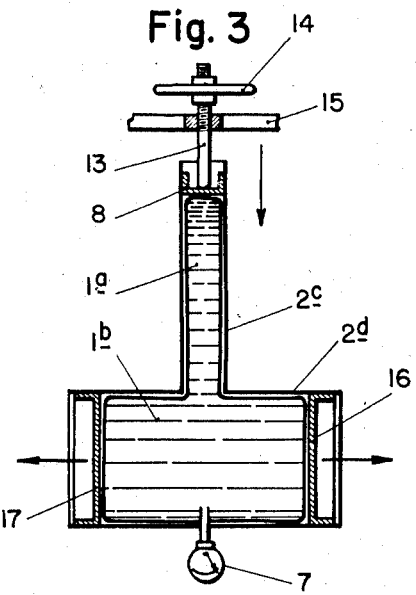
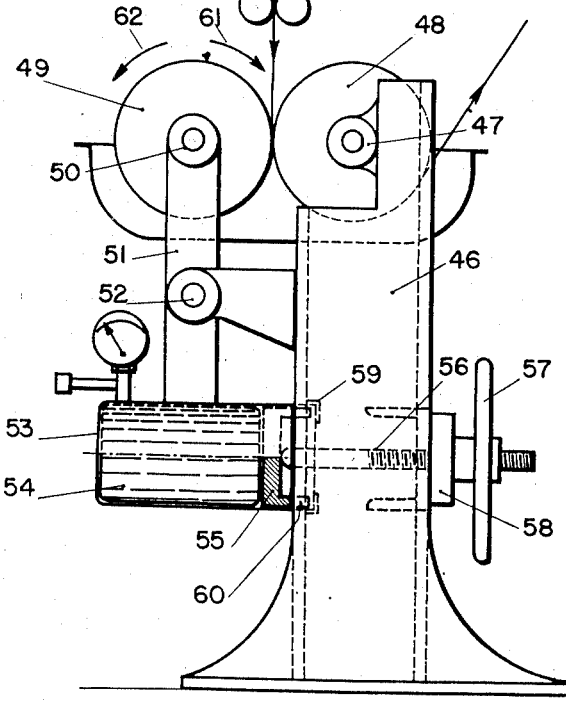
Fig. 8
INVENTOR:
JULIEN DUNGLER
BY Geo. M. Straus

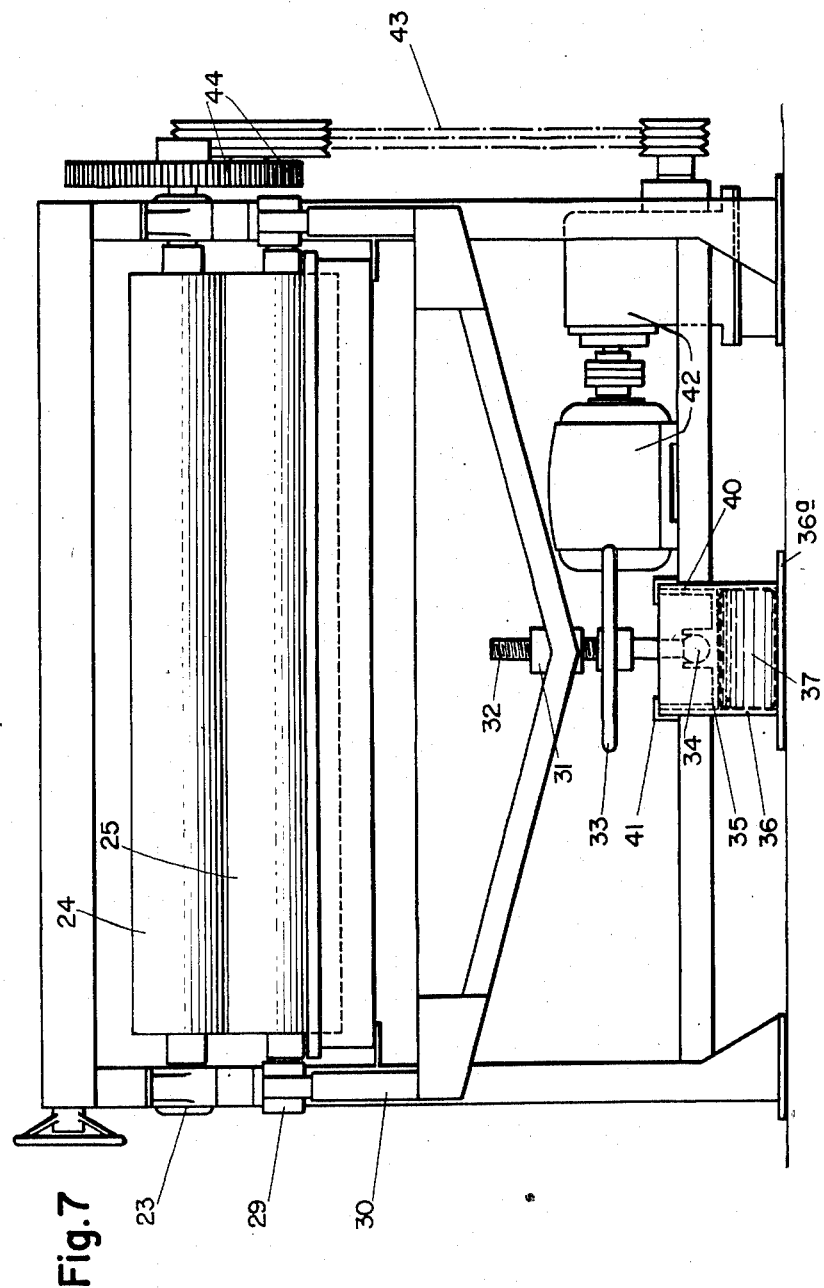

Patented Dec. 30, 1952

2,623,361

UNITED STATES PATENT OFFICE 2,623,361

FLUID ACTUATED PRESSURE DEVICE

Julien Dungler, Basel, Switzerland

Application February 27, 1948, Serial No. 11,711
In France October 25, 1947

11 Claims. (Cl. 60—62.5)

Many pressure exerting devices actuated by pneumatic or hydraulic means have been heretofore known. Such devices have the advantage of enabling a very flexible transmission and adjustment of the pressure to be obtained, but at the same time they have the drawback of requiring the continuous operation either of a compressor, or of a pump, thereby complicating such equipments and making them uneconomical for comparatively low-power plant.

The device according to the invention, which has the flexibility of transmission and of adjustment of the known devices without having the aforesaid drawback, comprises, in combination, at least, a fluid-tight reservoir with flexible or deformable wall which contains a gaseous or liquid fluid, a rigid casing surrounding the reservoir in such a manner as to be in contact with the same except over a predetermined area, and movable means adapted to exert a pressure against said area of the reservoir which is not in contact with the casing.

One of the main features of the invention is to provide means affording sliding movement within a casing of a piston or pistons against a resilient reservoir to cause the latter to perform displacement of machine parts.

According to the invention, the casing may be stationary so as to absorb the pressure exerted by the piston on the reservoir.

According to another feature of the invention, the piston may co-operate with stationary means which enable an adjustable pressure to be exerted against the reservoir, the casing being movable so as to be capable of transmitting the pressure of the piston to a movable member secured to the casing.

According to still another feature of the invention, the piston may co-operate with movable actuating means interposed between the piston and a movable member against which a pressure is to be exerted, the casing in this case remaining stationary.

According to another feature of the invention, the opposite face of the piston to the one that exerts a pressure against the reservoir may co-operate with an abutment secured to the casing in such a manner that the operation of the actuating means in one direction produces a pressure on the movable member to be actuated, whereas the operation of said means in the other direction mechanically effects the retraction of the movable member.

According to a further feature of the invention, the reservoir is equipped with a pressure gauge and with fluid filling and emptying means.

According to another feature of the invention, the fluid in the reservoir may be subjected to a predetermined filling pressure.

According to a still further feature of the invention, the casing may be stationary and be provided with a plurality of movable pistons, some of which being driving pistons while the remaining ones are driven or displaced pistons.

According to another feature of the invention, the pistons of a device comprising a plurality of pistons may be of different diameters or cross-sections.

According to another feature of the invention, the cross-section of the casing, and consequently that of the reservoir in contact with same may vary along the length of these elements.

According to another feature of the invention, a single piston may co-operate with two reservoirs located on either side of said piston in the same casing.

According to a further feature of the invention, the device may be used as a shock-absorber, the casing being secured to the member which is to absorb the shocks, whereas the piston is secured to the member whose movements are to be damped.

According to a still further feature of the invention, the device may co-operate with the presser roller of a padder or foulard, a calender, a watermangle, a roller press for paper or the like.

According to a still further feature of the invention, a single piston may act on a plurality of reservoirs located in separate casings and exerting a pressure on one of them, means being provided for placing the separate reservoirs in communication with one another.

Other features and advantages of the invention will become apparent from the ensuing description; reference will be made to the accompanying drawings in which:

Fig. 1 is a longitudinal sectional view of a device according to the invention used as a shock-absorber.

Fig. 2 is a longitudinal section of a pressure device having a driving piston and a driven piston.

Fig. 3 is a section of a pressure device comprising a driving piston and two opposed driven pistons.

Fig. 4 shows a longitudinal section of a device comprising one driving piston co-operating with two driven pistons.

Fig. 5 shows a pressure device with a differential cross-section and a movable casing.

Fig. 6 shows an elevational view of the application of the device according to the invention for operating the pressure roller of a foulard.

Fig. 7 shows a front view of the device according to Fig. 6, and

Fig. 8 is a similar view to that of Fig. 6, showing a modification.

The device shown in Fig. 1 comprises a hermetically closed reservoir 1 adapted to contain a gaseous or liquid fluid. Said reservoir has flexible fluid-tight walls which are preferably resilient. It may be made of an impermeable fabric, rubber, or any other suitable flexible or deformable material, and it may also be made of foil material.

The resilient fluid-tight reservoir 1 is housed within a casing 2 forming a rigid cylindrical metal tube. It should be noted that the casing 2 surrounds the reservoir 1 over the entire outer face thereof except at the upper part which is located opposite a piston 3 which is adapted to slide in the casing 2.

The piston 3 is secured to a tubular member 4 which is adapted to slide lengthwise and on the outside of the casing 2 whereby the latter forms a guide for the piston 3. A lug 5 enables the movable system 3—4 to be fixed to a movable member, (not shown) the movements of which are to be damped. The casing 2 is fixed by means of lug 6 to the member, (not shown) intended to absorb the shocks transmitted to the piston 3.

The reservoir 1 may be equipped with a pressure gauge 7, the pipe of which passes through the wall of the casing 2, thereby enabling the pressure in the reservoir 1 to be read.

The above device operates as follows: when the piston 3 effects a downward movement by the action of a shock received by the movable member (not shown) to which it is secured, it compresses the fluid contained in the reservoir 1, since the resiliency of the walls of the reservoir 1 enables the piston 3 to effect its down-stroke by pushing back the wall of the reservoir 1 facing it, but owing to the fact that the remainder of said wall is in contact with the rigid casing 2, the compression produced by the piston 3 cannot be compensated by a corresponding expansion of another part of the reservoir so as to increase the pressure in the reservoir 1. In this manner, the pressure exerted on the piston 3 is transmitted to the stationary casing 2 by means of the pneumatic or hydraulic cushion formed by the reservoir 1. When the pressure on the piston 3 stops, all the elements resume their original position owing to the reaction of the fluid contained in the reservoir 1 and to the resiliency of the walls thereof.

It should be noted that enclosing the shock-absorbing fluid in the fluid-tight resilient reservoir 1 gives the device a practically unlimited life without risk of losses of the shock-absorbing fluid.

Fig. 2 shows the device according to the invention, as applied to a pressure exerting device. It also comprises a fluid-tight reservoir 1 with resilient walls, which is housed inside a cylindrical casing comprising two portions of different cross-sections 2$^a$ and 2$^b$.

In the casing 2$^a$ is adapted to slide a piston 8 secured to a piston rod 9 by means of which a pressure, obtained, for example, from an adjustable operating device (not shown), can be transmitted to the piston 8 and consequently to the surface of the reservoir 1 which is located opposite the piston 8.

Another piston 10, the diameter of which is larger than that of the piston 8, is adapted to slide in the portion 2$^b$ of the casing so as not to be in contact with that surface of the reservoir 1 which is exposed within the casing 2$^b$. A piston rod 11 is secured to the piston 10 on the one hand, and to a movable member (not shown) which it is desired to be subjected to a pressure, such as a presser roller of a calender, or other machine, on the other hand.

The reservoir 1 is connected to a pipe 7$^a$ on which is mounted a pressure gauge 7 and a cap 12 for filling and emptying reservoir 1. The pressure gauge 7 enables the instantaneous pressure in the reservoir 1 to be read. The fluid contained in the reservoir 1 may be subjected beforehand to a pressure which can be read on the pressure gauge 7.

The above device operates as follows: A pressure, which is exerted by the piston 8 on the adjacent face of the reservoir 1 by means of any mechanical actuating device (not shown), is transmitted by the fluid contained in said reservoir 1 to the opposite surface which is in contact with the piston 10 to thereby push said piston 10 back. Owing to the fact that the diameter of the piston 10 is larger than that of the piston 8, the pressure exerted on the piston 10 is increased.

Fig. 3 shows a modification in which the fluid reservoir comprises two inter-communicating sections 1$^a$ and 1$^b$ which are housed in a rigid casing comprising the two sections 2$^c$ and 2$^d$ having different diameters.

In the casing section 2$^c$ there is slidably disposed a piston 8 which is coupled to a screw-threaded rod 13 which in turn is secured to a hand-wheel 14 and which screws into a stationary element 15.

The casing section 2$^d$ contains two oppositely located pistons 16 and 17 which are in contact with the contiguous exposed end faces of the reservoir section 1$^b$ where same is not surrounded by the casing 2$^d$. The diameter of the pistons 16 and 17 is larger than that of the piston 8. A pressure gauge 7 enables the pressure inside the reservoir 1$^a$—1$^b$ to be read.

The device operates in a similar manner as that explained with reference to Fig. 2. By screwing the screw-threaded rod 13 into the element 15 by means of the hand-wheel 14, the piston 8 is moved forwards so as to exert a pressure on the face of the reservoir 1$^a$, said pressure being transmitted by means of the fluid contained in the reservoir 1$^a$—1$^b$ to the end faces and also to the pistons 16 and 17 which are thus urged in outward direction according to the arrows so as to exert in turn a pressure on associated members which it is desired to subject to a pressure. In view of the difference in diameters of the pistons 16 and 17 with respect to piston 8 an increase in pressure on pistons 16, 17 takes place. By means of the screw 13, the pressure exerted on the piston 8 and consequently transmitted to the pistons 16 and 17 can be adjusted, and said pressure can be read on the pressure gauge 7.

It should be noted that the above device enables a given pressure to be maintained indefinitely without requiring the operation of a pump or other machine, and without risk of loss of fluid.

Fig. 4 shows a modification in which a piston 18 located in a rigid cylindrical casing 2ᵉ is adapted to co-operate with two independent reservoirs 20 and 21 arranged on either side of the piston 18 inside the casing 2ᵉ. The reservoir 21 is of toroidal shape so as to allow the piston rod 19 to pass therethrough. The two reservoirs 20 and 21 are equipped with pressure gauges 7 and with filling and emptying devices 12.

Whereas in the foregoing devices the actuating piston only acted in one direction, the piston 18 of the above device acts in both directions, owing to the fact that it co-operates in one direction with the reservoir 20, and in the other direction with the reservoir 21.

The device may be used as a shock-absorber. In that case, the piston rod 19 is secured to the movable member whose movements are to be damped, whereas the casing 2ᵉ, which is intended to absorb the shocks by means of the fluids contained in the reservoirs 20 and 21, is stationary.

The device can also be used as a pressure device which is intended to transmit an adjustable pressure to a movable member to be actuated in two opposite directions. In this case, the piston rod 19 may be secured to any actuating device, whereas the casing 2ᵉ is directly or indirectly secured to the movable member to be actuated.

Fig. 5 shows a modification of a pressure device provided with a reservoir comprising two sections 1ᶜ and 1ᵈ housed inside a casing 2ᶠ—2ᵍ whose shape corresponds to that of said sections.

A piston 8, actuated by a screw-threaded rod 13 which is secured to a hand-wheel 14 and which screws into a stationary member 15, is adapted to slide in the casing section 2ᶠ so as to exert a pressure on the section 1ᶜ of the reservoir, whereas the section 2ᵍ of the casing is completely closed in such a manner that a pressure exerted on the piston 8 and consequently on the reservoir 1ᶜ—1ᵈ tends to drive back the casing 2ᶠ—2ᵍ. In practice, the casing 2ᶠ—2ᵍ may be secured to the movable member to be actuated.

Figs. 6 and 7 show the application of the device according to the invention to a foulard. On a framework 22 are mounted the bearings 23 of a stationary roller 24, whereas the movable presser roller 25 is journalled in bearings 26 mounted at an intermediate point of rocking levers 27 which are pivotally connected at one of their ends, at 28, to the framework of the machine, and at the other end, at 29, to a U-shaped stirrup 30. The stirrup 30 is provided with a central screw-threaded bush 31 into which screws a screw-threaded rod 32 secured to a hand-wheel 33. The lower end of the rod 32 is coupled, by means of a coupling device 34 enabling the rod 32 to rotate, to a piston 35 adapted to slide in a cylindrical casing 36 in which is housed a reservoir 37 with resilient walls which enclose a gaseous or liquid fluid. The casing 36 is fixed to the ground or to the framework of the machine by means of lugs 36ᵃ.

The reservoir 37 is equipped with a pressure gauge 38 and with a filling and emptying cap or like device 39.

The piston 35 is provided with rear extensions 40 adapted to co-operate with abutments 41 located on the open rear end of the cylinder casing 36.

The foulard is driven in the usual manner by a power unit 42 comprising a motor and a speed reducer which, by means of belts 43, actuates a gearing comprising gear wheels 44. The cloth or other material treated is shown at 45.

The above device operates as follows: when the hand-wheel 33 is actuated so as to move the piston 35 downwards, said piston exerts a pressure on the reservoir 37 so as to compress the fluid contained in same. Owing to the fact that the cylindrical casing 36 and consequently the reservoir 37 are stationary, the compression of the fluid causes the bush 31 to move backwards and rock the lever 27 in such a manner as to press the presser roller 25 against the stationary roller 24. The pressure set up can be read on the pressure gauge 38. It is thus possible to produce an adjustable and permanent pressure between the rollers 24 and 25.

When the hand-wheel 33 is rotated in the other direction so as to withdraw the piston 35, the pressure exerted on the reservoir 37 and consequently on the presser roller 25 is first released. If the hand-wheel 33 is further rotated, the extensions 40 of the piston 35 are pressed against the abutments 41, which, owing to the fact that the abutments 41 are stationary, has the effect of moving the bush 31 downwards and of rocking the lever 27 downwards so as to move the presser roller 25 away from the stationary roller 24. It is thus possible not only to adjust the pressure between the rollers 24 and 25, but also to move said rollers away from one another, for example in order to insert the cloth 45.

Fig. 8 shows a modification of a foulard equipped with the device according to the invention. The frame 46 supports the bearings 47 of the stationary roller 48, whereas the presser roller 49 is journalled in bearings 50 secured to a stirrup 51 similar to the stirrup 30 of Fig. 7, said stirrup being journalled at 52 on a bracket secured to the frame 46. At its lower part, the stirrup 51 is secured to a cylinder 53 provided with a resilient fluid reservoir 54 and a sliding piston 55 adapted to exert a pressure on said reservoir. The piston 55 is coupled to a screw-threaded rod 56 which, by means of a hand-wheel 57, can be screwed in both directions into a member 58 secured to the frame 46. The open rear end of the cylinder casing 53 is provided with abutments 59 adapted to cooperate with rear extensions 60 of the piston 55. The device operates as follows: By causing the piston 55 to move forward into the cylinder casing 53 upon actuating the hand-wheel 57, the pressure exerted thereby on the fluid contained in the reservoir 54 causes the stirrup 51 to rock in such a manner as to press the presser roller 49 in the direction of the arrow 61 against the stationary roller 48. By rotating the hand-wheel 57 in the opposite direction, the pressure between the rollers 48 and 49 is first eliminated, then when the extensions 60 encounter the abutments 59, they move the cylinder 53 so as to rock the stirrup 51 in the direction of the arrow 62, which has the effect of moving the rollers 48 and 49 apart.

Of course, the embodiments hereinbefore described and illustrated in the drawings are only given by way of mere non-limitative examples, and it is possible to modify in any suitable manner, the shape, the nature, the arrangement and the mounting of their elements without exceeding the scope of the invention. Thus, the pressure device may comprise a plurality of actuating pistons, one of which may, for example, be used for a rough or preliminary adjustment, whereas the other is intended for the final and accurate adjustment. The reservoir need not completely fill the casing in such a manner that the pressure inside the reservoir is partly determined by the resilient deformation of same. The reservoir need not necessarily be completely separated from the casing, but a portion of the walls of the reservoir and of the casing may comprise common elements.

Although the invention has been described and illustrated as applied to a shock-absorber and also to a pressure device for foulard its use is in no way limited to the aforesaid applications but may cover the most varied fields wherein it is advantageous to use pneumatic or hydraulic pressure devices. Thus, the device according to the invention can be used for calenders, presses or other machines.

Having thus described the invention, what is claimed as new and desired to be secured by Letters Patent, is:

1. Fluid-actuated pressure device comprising in combination, at least one fluid-tight closed reservoir, a deformable endless wall defining said reservoir and hermetically enclosing a fluid therein, a rigid casing surrounding said reservoir in such a manner as to be in contact with the wall of said reservoir except over a predetermined area thereof, and movably arranged means adapted to exert a pressure on the surface of said wall of said reservoir positioned at said area which is devoid of contact with said casing, said movable means comprising at least one piston adapted to slide in said casing and conformed to the shape of the latter.

2. In a pressure device, as set forth in claim 1, wherein said casing is stationary so as to absorb pressure exerted by said movable means on the reservoir.

3. In a pressure device, as set forth in claim 1, including a movable member secured to said casing, stationary means arranged to take up pressure exerted by said movable means against the reservoir, said casing being movable so as to be capable of transmitting pressure of the piston to said movable member.

4. In a pressure device, as set forth in claim 1, wherein a piston cooperates with movable actuating means interposed between said piston and a movable member on which a pressure is to be exerted, said casing being stationary.

5. In a pressure device, as set forth in claim 1, wherein said movable means forms a piston, an abutment secured to said casing in such a manner that by operating said piston in one direction a pressure is exerted on a movable member to be actuated, whereas by operating said piston in opposite direction withdrawal of the movable member is mechanically effected and the path of said piston is limited by said abutment.

6. In a pressure device, as claimed in claim 1, wherein the reservoir is equipped with a pressure gauge and with filling and emptying means.

7. In a pressure device, as claimed in claim 1, wherein fluid located in the reservoir is subjected to predetermined inner pressure.

8. In a pressure device, as claimed in claim 1, wherein said casing is stationary and comprises a plurality of movable pistons, driving pistons and driven pistons, respectively.

9. In a pressure device, as claimed in claim 1, wherein said movable means form pistons of different cross-sections.

10. In a pressure device, as claimed in claim 1, wherein the cross-section of the casing and that of the reservoir in contact with said casing vary along the length of said casing.

11. In a pressure device, as claimed in claim 1, including a single piston forming said movable means and cooperable with said reservoir extending on either side of said piston in the same casing.

JULIEN DUNGLER.

REFERENCES CITED

The following references are of record in the file of this patent:

UNITED STATES PATENTS

| Number | Name | Date |
| --- | --- | --- |
| 850,181 | Podstata | Apr. 16, 1907 |
| 906,923 | Podstata | Dec. 15, 1908 |
| 1,995,659 | Trier | Mar. 26, 1935 |
| 2,178,490 | Nielsen | Oct. 31, 1939 |
| 2,250,734 | Thompson | July 29, 1941 |